United States Patent

Dias

[15] 3,654,574

[45] Apr. 4, 1972

[54] ACOUSTIC-WAVE TRANSMITTING SYSTEM HAVING CURVILINEAR TRANSDUCERS

[72] Inventor: Fleming Dias, Chicago, Ill.

[73] Assignee: Zenith Radio Corporation, Chicago, Ill.

[22] Filed: Aug. 18, 1970

[21] Appl. No.: 64,710

[52] U.S. Cl. ....................333/30, 333/71

[51] Int. Cl. ....................H03h 7/30, H03h 9/30

[58] Field of Search ....................333/30, 30 M, 71, 72

[56] References Cited

UNITED STATES PATENTS

| | | | |
|---|---|---|---|
| 3,406,358 | 10/1968 | Seidel et al. | 333/71 |
| 3,423,700 | 1/1969 | Curran et al. | 333/72 |
| 2,836,737 | 5/1958 | Crownover | 333/30 |
| 3,516,027 | 6/1970 | Wasilik | 333/30 |
| 3,409,848 | 11/1968 | Meitzler et al. | 333/71 |

*Primary Examiner*—Herman Karl Saalbach
*Assistant Examiner*—Saxfield Chatmon, Jr.
*Attorney*—John J. Peduson and John H. Coult

[57] ABSTRACT

The system comprises a substrate capable of propagating acoustic surface waves. Disposed near opposite ends of the substrate are an input transducer that responds to an input signal for launching acoustic surface waves and an output transducer that responds to those waves for developing an output signal which is fed to a load. Extending lengthwise down the center of the wave-propagating surface is an acoustic wave guide that concentrates acoustic surface waves along a propagation path between the two transducers. Each of the transducers includes a pair of interleaved combs of conductive electrodes coupled piezoelectrically to the substrate. Adjacent teeth in the combs are spaced apart by one-half the acoustic wavelength and are curved concavely toward the adjacent end of the strip.

3 Claims, 2 Drawing Figures

Inventor
Fleming Dias
By Francis W. Crotty
Attorney

ACOUSTIC-WAVE TRANSMITTING SYSTEM HAVING CURVILINEAR TRANSDUCERS

BACKGROUND OF THE INVENTION

The present invention pertains to acoustic-wave transmitting devices. More particularly, it relates to surface wave integratable filters or delay lines.

Much interest has been directed recently to the use of surface wave devices in signal transmission circuits in place of conventional electronic circuitry that includes bulky and sometimes expensive discrete components. A number of different versions of such devices are described, and still others are cross-referenced, in copending application Ser. No. 721,038, filed Apr. 12, 1968, in the name of Adrian J. DeVries and assigned to the assignee of the present application. One particularly attractive feature of these devices is that the frequency response of selectivity of the signal-transmission path may be tailored essentially as desired by variations in the rather simple electrode configurations involved. Another distinct advantage is that the devices may be formed by conventional integrated-circuit techniques and a complete set of selective stages, such as a television intermediate-frequency amplifier, may be formed on a very thin substrate having length and width dimensions that are but a fraction of an inch.

One difficulty that has been encountered in at least certain acoustic wave devices arises from the tendency of the traveling acoustic surface waves to diverge or spread apart. In a delay line implementation, this problem increases as the input and output transducers are spaced farther apart to create greater delay. The problem also appears in filters as the transducer spacing is increased in an effort to reduce capacitive feed-through or cross-talk. Such divergence can lead to the development of spurious reflected energy and result in higher insertion loss because a portion of the surface wavefronts fails to intercept the output transducer. In an effort to overcome these difficulties, it has been suggested that a wave guidance device be employed between the input and output transducers to eliminate such beam spreading by concentrating the waves into a narrower path than otherwise would be the case. Such wave guiding strips are disclosed in U. S. Letters Pat. Nos. 3,406,358, issued Oct. 15, 1968, to Seidel and White and 3,409,848, issued Nov. 5, 1968, to Meitzler and Tiersten.

In practicing the techniques of the foregoing patents, however, the guidance properties of such strips accommodate surface wavefront widths of only a certain amount, as a result of which the input and output transducers have as a practical matter been limited in effective width. That limitation has also placed a restriction upon the range of impedances available for matching purposes in the design of the transducers. Similarly, by reason of limitations on width of the transducers the surface waves generated spread in the process of being fed to the guide.

For example, surface wave transducers are now well known which take the form of interleaved combs of conductive electrodes. The impedance presented by those electrode arrays varies in proportion to the length of the teeth in the combs. As discussed in the aforementioned copending application, modified multiple comb structures in series combination permit still further adjustment of the impedance they present. However, the benefit that thus might be obtained in a given application, by increasing the width across the substrate of the transducer comb patterns, is at least partially negated when it is also attempted to take advantage of a strip waveguide for the purpose of overcoming the problem of beam spreading.

SUMMARY OF THE INVENTION

It is, accordingly, a general object of the present invention to provide a new and improved acoustic-wave transmitting device in which the last-discussed difficulties or disadvantages are overcome.

Another object of the present invention is to provide a new and improved acoustic-wave transmitting device in which transducers that interact with acoustic surface waves having comparatively wide wave fronts are fully compatible with the concurrent use of narrow acoustic-wave guides extending between input and output transducers.

The invention is for utilization in an acoustic-wave transmitting system having a medium for propagating acoustic waves along a surface thereof and further having a wave guide extending between input and output portions of the medium for concentrating acoustic waves into a predetermined propagation path to minimize spreading of the waves across the surface. In accordance with the invention, a pair of surface wave interaction devices is disposed across the path and coupled to the input and output portions of the medium to respond to surface waves propagated through the wave guide. At least one, but preferably both, of the interaction devices is comprised of a pair of interleaved arrays of curvilinear concentric electrode elements defining a C-shaped structure facing its associated end of the wave guide.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements and in which:

FIG. 1 illustrates a very simple embodiment of the present invention. It will become evident upon reference to the aforesaid copending application that many of the variations and modifications disclosed therein are equally applicable to the device of FIG. 1. As shown, a signal source 10 is connected across an input transducer of surface wave interaction device 12 mechanically coupled to the input portion of one major surface of a body of piezoelectric material, shown as a substrate 13, which serves as an acoustic-surface-wave propagating medium. An output or second portion of the same surface of substrate 13 is, in turn, mechanically coupled to an output transducer 14 across which a load 15 is coupled. Transducers 12 and 14 in this simple arrangement are identical and are individually constructed of two comb-type electrode arrays. The conductive teeth of one comb are interleaved with the teeth of the other. The combs are of a material, such as gold or aluminum, which may be vacuum deposited on a smoothly-lapped and polished planar surface of a piezoelectric body. The piezoelectric material is one, such as PZT, zinc oxide and cadmium sulphide, that propagates acoustic surface waves and is isotropic in one plane.

Figure 1:
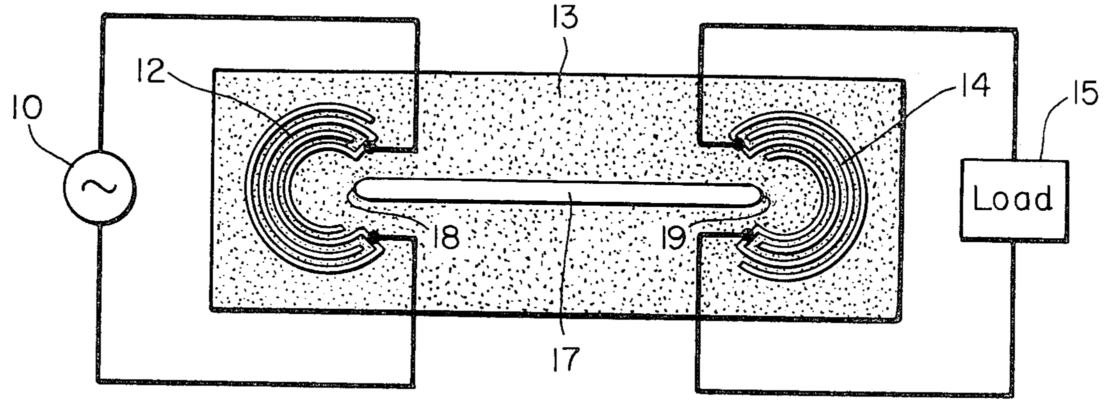
FIG. 1 is a partly schematic plan view of an acoustic-wave transmitting device.

Direct piezoelectric surface-wave transduction is accomplished by the spatially periodic interdigital electrodes or teeth of transducer 12. A periodic electric field is produced when a signal from source 10 is fed to the teeth and, through piezoelectric coupling, the electric signal is transduced to a traveling acoustic wave on substrate 13. This occurs when the stress components produced by the electric field in the substrate are substantially matched to the stress components associated with the surface-wave mode. Source 10, for example the radio-frequency portion of a television receiver tuner, produces a range of signal frequencies, but due to the selective nature of the arrangement only a particular frequency and its intelligence carrying sideband are converted to surface waves. Those surface waves are transmitted along the substrate to output transducer 14 where they are converted to an electrical signal for application to load 15 which in this example represents a subsequent radio-frequency stage of the tuner such as the heterodyne converter which downshifts the signal frequency to an intermediate frequency.

The potential developed between any given pair of successive teeth in electrode array 12 produces two waves traveling along the surface of substrate 13. Were the teeth in transducer 12 straight, the two waves would travel in opposing directions, perpendicular to the teeth for the illustrative isotropic case of a ceramic which is poled perpendicularly to the surface. As utilized herein, however, the teeth are curvilinear concentric electrode elements collectively defining a C-shaped transducer structure. Consequently, one of the pair of concurrently developed surface waves is directed radially inward with every incremental portion thereof traveling perpendicularly away from the corresponding incremental portion of the tooth from which it was launched. The other of the two surface waves is launched radially outward from transducer 12. In the present simplified embodiment, that outwardly directed wave is not utilized. As referenced more fully in the aforesaid copending application, such an unused surface wave may be attenuated by absorption at or near the edges of substrate 13 or it may be reflected backwardly so as to arrive again at transducer 12 in proper phase to augment the operation of the transducer.

In any event, when the center-to-center distance between the teeth of transducer 12 is one-half of the acoustic wavelength of the wave at the desired input frequency, relative maxima for the output waves may be produced by the piezoelectric transduction in transducer 14. For increases selectivity, additional electrode teeth are added to the comb patterns of transducers 12 and 14.

Included on substrate 13 and extending between its input and output portions to which transducers 12 and 14 are coupled is an elongated strip 17 of acoustic-wave-orienting material. Strip 17 constitutes a wave guide which concentrates the acoustic surface waves launched by transducer 12 along a predetermined propagation path the width of which is defined by the width of the surface wavefronts therein. The path width is substantially less than the widths of the acoustic wavefronts as initially launched and which correspond to the length of the teeth in transducer 12. Because transducer 12 is disposed symmetrically across the path with its electrode elements curved concavely toward the near end of wave guide 17, the launched acoustic waves are converged toward the wave guide; that is, the effect of curving the teeth in transducer 12 is to narrow the wavefronts of the surface waves emitted by the transducer to concentrate of converge them upon the adjacent end portion of wave guide 17.

A generally reversed action takes place at the other end of the wave guide. The acoustic surface waves that have been guided in a concentrated path diverge or fan apart upon traveling beyond the end of strip 17. In so spreading apart, those waves interact generally throughout the length of the arcuate teeth of transducer 14, which, as herein illustrated, is a mirror image of transducer 12. It is, nevertheless, unnecessary in all applications to utilize the curved form of transducer at both ends of wave guide 17. Where appropriate impedance matching and efficiency permit, a more conventional transducer may be employed at one of the ends. The particular structure of wave guide 17 is not critical. However, it is preferred that the ends 18 and 19 thereof, adjacent to the respective transducers, be rounded so as to conform generally to the shape of the wave fronts. Basically, strip 17 constitutes a longitudinally extending perturbation that either decreases the net phase velocity of the surface waves of raises their net attenuation. As specifically illustrated, strip 17 is composed of a material that either exhibits a lower phase velocity of a higher intrinsic loss than the material of substrate 13. Generally speaking, the concentrating or guidance effect is greater with an increase in the difference between the velocity or intrinsic dissipation of the strip and the corresponding propagating parameter of the substrate.

By way of illustration, strip 17 may be a rectangular ribbon of relatively low velocity material such as gold. The strip is disposed directly upon the planar upper surface of substrate 13 which is a higher velocity material. More specifically, the materials of strip 17 and substrate 13 are chosen so that the magnitude of the surface wave velocity of the strip material is less than that of the substrate without the strip. As discussed more fully in the above-indentified patents, it is advantageous in many applications that the surface wave energy not be completely confined to the strip. Further details concerning the formation and theory behind strip 17 also will be found in those patents. While as shown strip 17 straight, it may be curved or otherwise bent when it is desired to change the relative positions of the transducers.

Figure 2:
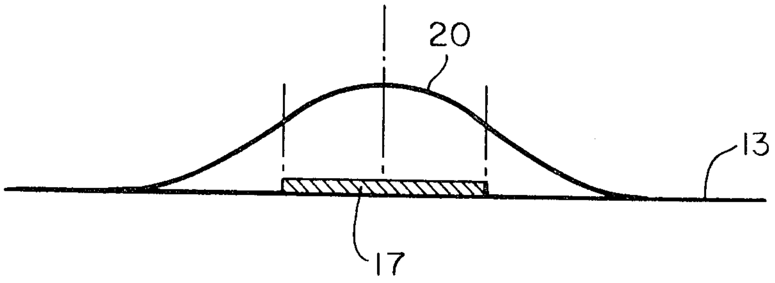
FIG. 2 is a plot illustrating an acoustic-wave intensity distribution along a cross section through the device of Figure 1.

Figure 2 illustrates the general distribution of surface-wave energy over the surface of substrate 13 in the vicinity of wave guide 17. That is, curve 20 indicates a peak amplitude of surface wave energy directly above the middle of strip 17 and that amplitude decreases toward and beyond the sides of the strip. It is to be noted that a significant portion of the energy is distributed over a region of the substrate outside the strip itself. A similar amplitude distribution is obtained in the alternative structure in which the strip is composed of a material that increases attenuation of the surface waves.

As also described in one of the aforesaid patents, strip 17 alternatively may constitute a slot cut into the upper surface of the wave propagating medium which constitutes a relatively thin layer disposed upon a thicker underlying substrate. That thin layer is of a material whose propagation parameters are so related to those of the thicker underlying member that the surface-wave phase velocity is increased. The guiding slot is sufficiently deep to penetrate the thin layer and expose the underlying substrate as a result of which the acoustic waves developed by the input transducer again are concentrated in a comparatively narrow path.

Thus, wave guide 17 controls propagation of the acoustic surface waves, confining them to a narrow propagation path so that they do not spread across the surface of substrate 13. At the same time, the curved configuration of transducers 12 and 14 is particularly suited to interact with converging or diverging surface-wave energy. Consequently, the transducers themselves may be of substantially increased dimensions so as to enable the attainment of increased efficiency or better impedance matching.

While a particular embodiment of the present invention has been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. In an acoustic-wave transmitting system having a medium for propagating acoustic waves along a surface thereof and further having a wave guide extending between input and output portions of said medium for concentrating acoustic waves into a predetermined propagation path to minimize spreading of said waves across said surface, the improvement which comprises:

a pair of surface wave interaction devices disposed across said path and coupled to said input and output portions of said medium to respond to surface waves propagated through said guide, at least one which devices is comprised of a pair of interleaved arrays of curvilinear concentric electrode elements defining a C-shaped structure facing its associated end of said wave guide.

2. A system in accordance with claim 1 in which said wave guide has curvilinear terminating portions and in which said C-shaped structure is concentric with the adjacent terminating portion of said wave guide.

3. A system in accordance with claim 2 in which both of said interaction devices are C-shaped structures disposed concentrically with the associated terminating portion of said wave guide.

* * * * *